United States Patent [19]
Rizzotto, Sr.

[11] 4,111,479
[45] Sep. 5, 1978

[54] VEHICLE TOP CAMPER

[75] Inventor: John D. Rizzotto, Sr., Abington, Mass.

[73] Assignee: The Raymond Lee Organization, Inc., New York, N.Y. ; a part interest

[21] Appl. No.: 806,950

[22] Filed: Jun. 15, 1977

[51] Int. Cl. .................................................. B60p 3/32
[52] U.S. Cl. ............................. 296/23 MC; 135/1 A; 296/27
[58] Field of Search ................. 296/23 MC, 23 R, 27, 296/137 R; 135/1 A, 3 R, 3 A, 4 R, 4 A

[56] References Cited
U.S. PATENT DOCUMENTS

| | | | |
|---|---|---|---|
| 3,102,546 | 9/1963 | Guerrant | 135/1 A |
| 3,620,235 | 11/1971 | Duplessis | 135/1 A |
| 3,785,693 | 1/1974 | Fulton et al. | 296/27 |
| 3,955,731 | 5/1976 | Lindelef et al. | 296/23 MC |
| 4,058,133 | 11/1977 | Barr et al. | 296/23 MC |

Primary Examiner—Robert R. Song
Attorney, Agent, or Firm—Daniel Jay Tick

[57] ABSTRACT

First and second platforms are affixed to the roof of a motor vehicle. The second platform is hingedly affixed to the first platform and extends from the roof to an area over the front bumper in extended position. Braces support the front edge of the second platform at a predetermined distance above the front bumper to maintain such platform horizontal. Trusses foldably affixed to the sides of the platforms extend perpendicularly therefrom in extended position. Tent material is releasably affixed to the trusses to provide a collapsible tent structure.

2 Claims, 8 Drawing Figures

U.S. Patent     Sept. 5, 1978     Sheet 1 of 2     4,111,479
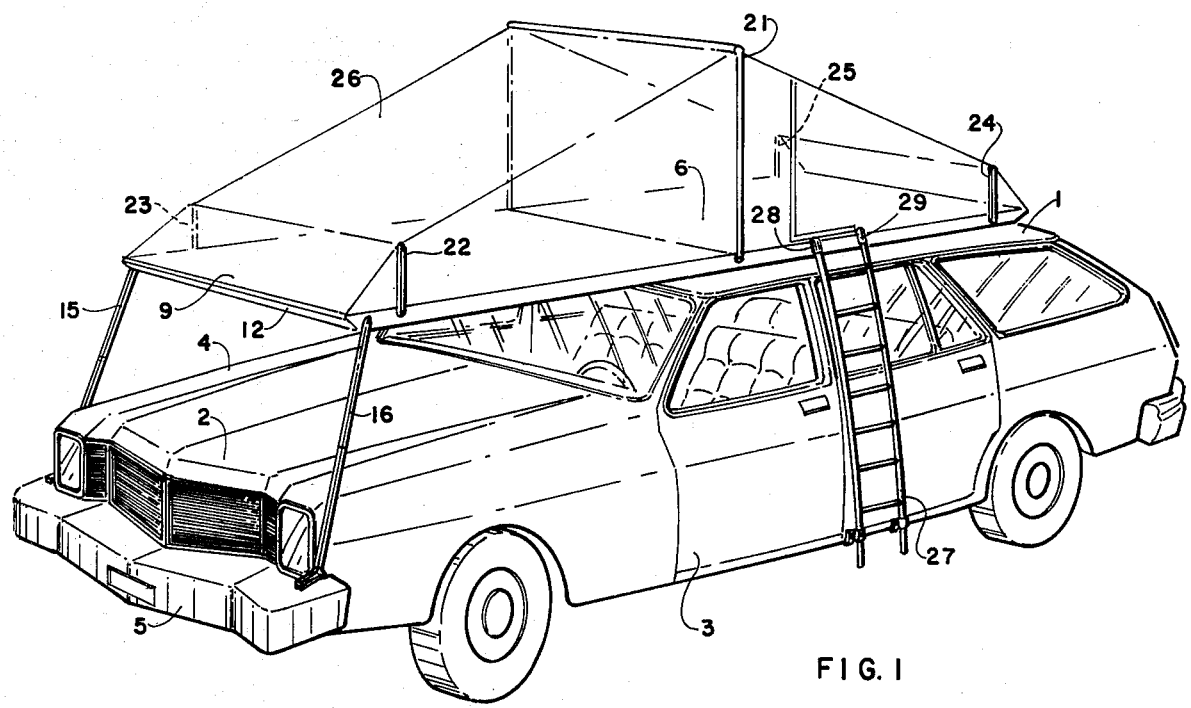
FIG. 1
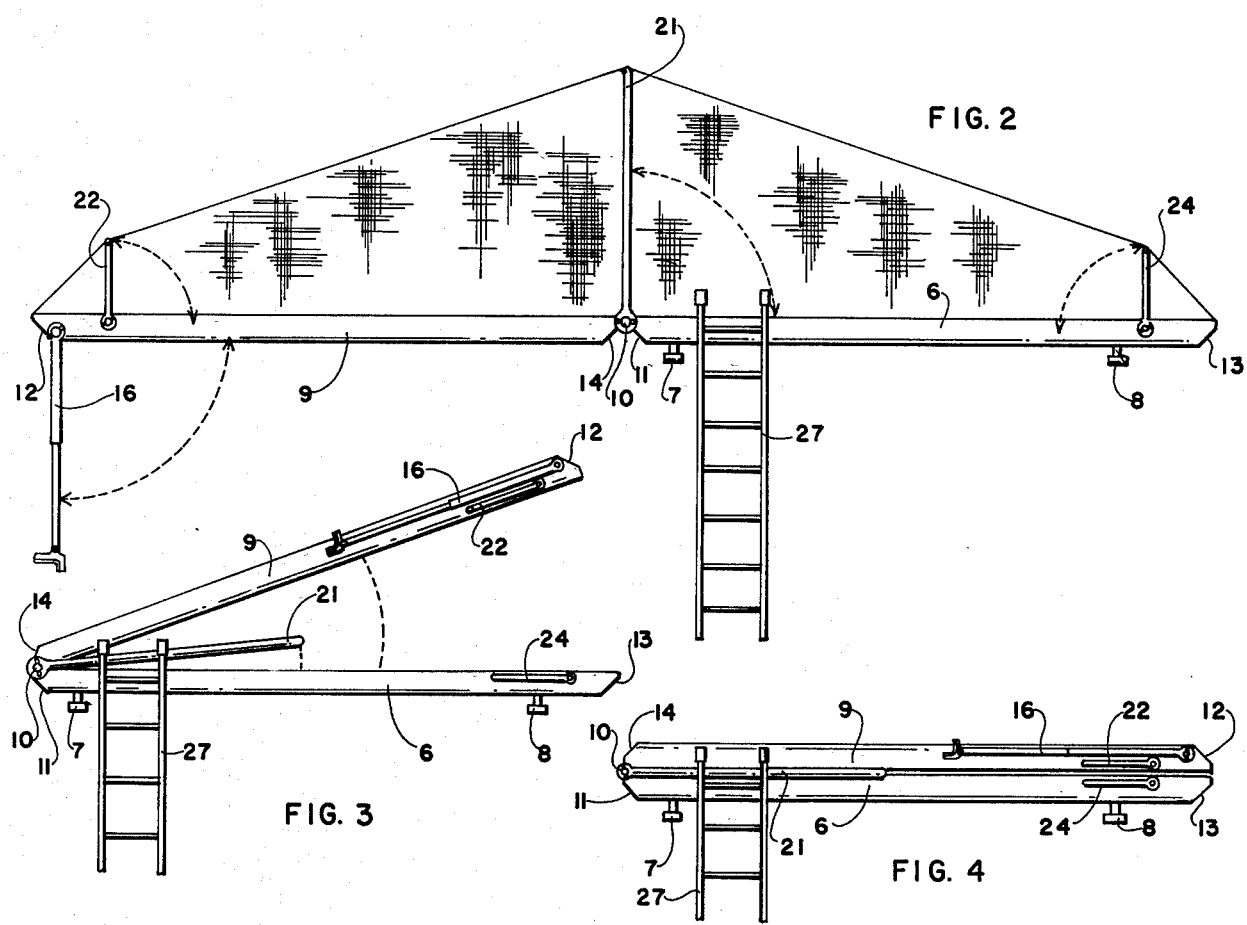
FIG. 2
FIG. 3
FIG. 4

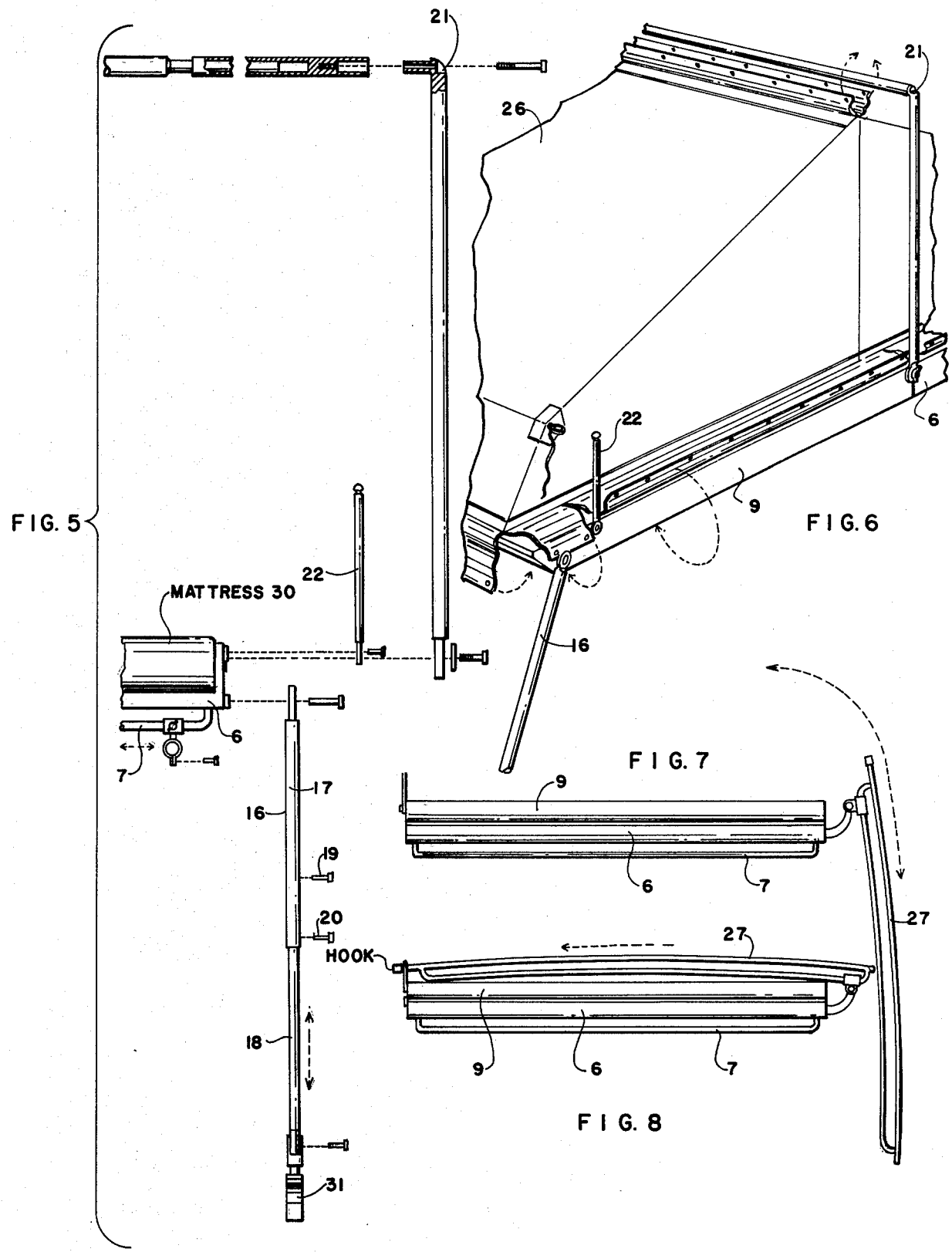

VEHICLE TOP CAMPER

BACKGROUND OF THE INVENTION

The present invention relates to a vehicle top camper. More particularly, the invention relates to a vehicle top camper mounted on the roof of a motor vehicle having a roof, sides and a front bumper.

Objects of the invention are to provide a vehicle top camper of simple structure, which is inexpensive in manufacture, installable with facility and convenience on new and existing motor vehicles of all types and sizes, readily transportable on top of a motor vehicle, and functions efficiently, effectively and reliably as a collapsible tent spaced above the ground whereby the occupants thereof are not subjected to the many hazards of sleeping on the ground.

BRIEF DESCRIPTION OF THE DRAWINGS

In order that the invention may be readily carried into effect, it will now be described with reference to the accompanying drawings, wherein:

FIG. 1 is a perspective view of an embodiment of the vehicle top camper of the invention mounted on a vehicle;

FIG. 2 is a side view, on an enlarged scale, of the platforms, braces and trusses of the embodiment of FIG. 1 in extended position;

FIG. 3 is a view of the components of FIG. 2 being folded to collapsed position;

FIG. 4 is a view of the components of FIG. 2 in collapsed position;

FIG. 5 is an exploded view, on an enlarged scale, of some of the components of the vehicle top camper of the invention;

FIG. 6 is a perspective view on an enlarged scale, showing part of the camper of the invention in extended position;

FIG. 7 is an end view of the embodiment of FIG. 1, showing the ladder in extended position; and FIG. 8 is an end view of the embodiment of FIG. 1, showing the ladder in collapsed position.

DETAILED DESCRIPTION OF THE INVENTION

The vehicle top camper of the invention is mounted on the roof 1 of a motor vehicle 2 having such roof, sides 3 and 4 and a front bumper 5, as shown in FIG. 1.

The vehicle top camper of the invention comprises a first platform 6 (FIGS. 1 to 8) affixed to the roof 1 of the vehicle 2. The first platform 6 is affixed to the roof 1 by any suitable means such as, for example, clamps, straps, or the like, used to secure luggage racks, or the like, to the roof of a vehicle. The first platform 6 is secured to the roof 1 of the vehicle 3 by cross bars 7 and 8, shown in FIGS. 2, 3 and 4.

A second platform 9 is hingedly affixed to the first platform 6, as shown in FIGS. 1 to 4 and 6 to 8. The second platform 9 is affixed to the first platform 6 by any suitable hinge arrangement 10 (FIGS. 2 to 4). The second platform 9 extends, in extended position, shown in FIG. 1, from the roof 1 to an area over the front bumper 5. In its storage position or collapsed position, the second platform 9 is in juxtaposition with the first platform 6, as shown in FIGS. 4, 7 and 8.

The first and second platforms 6 and 9 have front edges 11 and 12, respectively, and rear edges 13 and 14, respectively (FIGS. 2 to 4).

A pair of braces 15 and 16 (FIG. 1) removably support the front edge 12 of the second platform 9 at a predetermined distance above the front bumper 5, as shown in FIG. 1, to maintain the second platform substantially horizontal, as shown in FIGS. 1 and 2. The braces 15 and 16 are preferably adjustable in length. As shown in FIG. 5, each brace has a tubular member 17 foldably or pivotally affixed to the corresponding side of the second platform 6 at the front edge 12 thereof and a rod-like member 18 slidably mounted in the tubular member and adjustably secured in position therein by holes through the tubular members and a plurality of spaced holes passing through the rod-like members via bolts 19 and 20 selectively manually extended through such holes.

A center truss 21 is foldably or pivotally affixed to the sides of the first platform 6 at the front edge 11 thereof and extends substantially perpendicularly from the first platform in extended position, as shown in FIGS. 1 to 6. The center truss 21 is of square U-shaped configuration as shown in the FIGS. and functions as a main truss or support. A pair of first end trusses 22 and 23 are foldably or pivotally affixed to the sides of the second platform 9 at the front edge 12 thereof, as shown in FIG. 1. The first end trusses 22 and 23 extend substantially perpendicularly from the second platform 9 in extended position, as shown in FIG. 1, and are positioned alongside said platform in folded or collapsed position, as shown in FIGS. 3 and 4.

A pair of second end trusses 24 and 25 are foldably or pivotally affixed to the sides of the first platform 6 at the rear edge 13 thereof, as shown in FIG. 1. The second end trusses 24 and 25 extend substantially perpendicularly from the first platform 6 in extended position, as shown in FIG. 1, and extend alongside said platform in folded or collapsed position, as shown in FIGS. 3 and 4.

The center truss 21 is positioned between the first and second platforms 6 and 9, respectively in collapsed or folded position, as shown in FIG. 4. The center truss 21 extends approximately three times the distance of the first and second end trusses above the roof 1 of the vehicle 3 in extended position, as shown in FIGS. 1 and 2.

Tent material 26 (FIGS. 1 and 6) of any suitable type such as, for example, canvas, nylon, or the like, is releasably affixed to the center truss 21 and to the end trusses 22, 23, 24 and 25, by any suitable ties, clamps, fasteners, or the like. The combination of the trusses and tent material thus provides a collapsible tent structure.

The occupants of the tent structure reach it by a ladder 27 (FIGS. 1 to 4, 7 and 8), which is clamped to a side of the first platform 6, as shown in the FIGS. The ladder 27 is slidably mounted in a pair of sleeves 28 and 29 (FIG. 1) so that it is readily slidable, in its storage position, on top of the second platform 9, which, at such time, is atop the first platform.

One or more mattresses, of which a mattress 30 is shown in FIG. 5, are provided on the first and second platform 6 and 9 for the comfort of the occupants of the tent structure. The bottom parts of the braces 15 and 16 which abut the bumper 5 of the vehicle have rubber blocks 31 (FIG. 5) affixed thereto to prevent scuffing or damage to the bumper.

While the invention has been described by means of a specific example and in a specific embodiment, I do not wish to be limited thereto, for obvious modifications will occur to those skilled in the art without departing from the spirit and scope of the invention.

I claim:

1. A vehicle top camper mounted on the roof of a motor vehicle having a roof, sides and a front bumper, said vehicle top camper comprising a first platform affixed to the roof of the vehicle;

a second platform hingedly affixed to the first platform and extending from the roof to an area over the front bumper in extended position and in juxtaposition with the first platform in storage position, each of the first and second platforms having a front edge and a rear edge;

brace means for removably supporting the front edge of the second platform at a predetermined distance above the front bumper to maintain said second platform substantially horizontal;

center truss means foldably affixed to the sides of the first platform at the front edge thereof and extending substantially perpendicularly therefrom in extended position;

first end truss means foldably affixed to the sides of the second platform at the front edge thereof and extending substantially perpendicularly therefrom in extended position;

second end truss means foldably affixed to the sides of the first platform at the rear edge thereof and extending substantially perpendicularly therefrom in extended position; and tent material releasably affixed to the center and end truss means to provide a collapsible tent structure.

2. A vehicle top camper as claimed in claim 1, wherein the center truss means extends approximately three times the distance of the end truss means above the roof of the vehicle in extended position.

* * * * *